United States Patent [19]

Vancelette

[11] Patent Number: 5,894,320
[45] Date of Patent: Apr. 13, 1999

[54] MULTI-CHANNEL TELEVISION SYSTEM WITH VIEWER-SELECTABLE VIDEO AND AUDIO

[75] Inventor: Paul D. Vancelette, Langhorne, Pa.

[73] Assignee: General Instrument Corporation, Horsham, Pa.

[21] Appl. No.: 08/654,901

[22] Filed: May 29, 1996

[51] Int. Cl.$^6$ .................................................. H04N 7/173
[52] U.S. Cl. ........................ 348/7; 348/12; 455/4.1; 455/4.2; 455/5.1
[58] Field of Search ............................ 348/6, 7, 9, 10, 348/12, 13, 556, 563, 385, 386-432; 455/3.1, 4.1, 4.2, 5.1, 6.1, 6.2; H04N 7/173

[56] References Cited

U.S. PATENT DOCUMENTS

| | | |
|---|---|---|
| 4,903,126 | 2/1990 | Kassatly . |
| 5,068,733 | 11/1991 | Bennett . |
| 5,155,591 | 10/1992 | Wachob . |
| 5,231,494 | 7/1993 | Wachob . |
| 5,452,303 | 9/1995 | Shimizu ............................. 370/94.1 |
| 5,570,126 | 10/1996 | Blahut et al. ........................... 348/7 |
| 5,583,562 | 12/1996 | Wanderscheid et al. ............... 348/13 |
| 5,600,368 | 2/1997 | Matthews, III ...................... 348/143 |
| 5,610,665 | 3/1997 | Berman ............................... 348/564 |
| 5,619,250 | 4/1997 | McClellan et al. .................... 348/10 |
| 5,638,113 | 6/1997 | Lappington et al. .................. 348/12 |
| 5,668,592 | 9/1997 | Spaulding, II ...................... 348/13 |

FOREIGN PATENT DOCUMENTS

| | | |
|---|---|---|
| 2 301 269 | 11/1996 | United Kingdom . |
| WO 96 13940 | 5/1996 | WIPO . |

OTHER PUBLICATIONS

Kelly et al., Visual Computing Laboratory, Project Reports, *IEEE Multimedia*, Spring 1995, Visual Computing Laboratory, University of California, San Diego, pp. 94–99.

McVeigh et al., "Adaptive Reference Frame Selection for Generalized Video Signal Coding," presented at SPIE Electronics Imaging Meeting, Photonics West 1996, vol. 2668, published in *Digital Video Compression —Algorithms and Technology*, V. Bhaskaran, editor, Mar. 18, 1996, pp. 441–449.

*Primary Examiner*—Jeffrey R. Jastrzab
*Assistant Examiner*—Luanne P. Din
*Attorney, Agent, or Firm*—Barry R. Lipsitz; Ralph F. Hoppin

[57] ABSTRACT

A television viewer can select among a choice of available camera angles and audio feeds when viewing a sporting event such as a football game without changing the television channel. Audio, video and control data is transmitted in a packetized data stream with control data providing a pre-assigned channel designation (e.g., channel 10 for network X). A set-top terminal receives and processes the data stream according to user-provided commands. The terminal includes software which can be downloaded via the data stream or installed locally. The control data in the data stream is used to provide an on-screen graphical display on the television that allows the user to select the audio and video which correspond to certain areas of the football stadium, for example. Optionally, the viewer may select alternative story lines in a movie or similar program. A default setting provides primary audio and video signals. Alternative audio and video signals are selected by the user and mapped to the channel designator of the primary signal so that the different camera angles and audio feeds may be seen and heard. The viewer is therefore given the opportunity to customize the programming to enhance the entertainment or educational value.

25 Claims, 8 Drawing Sheets

MULTI-CHANNEL TELEVISION SYSTEM WITH VIEWER-SELECTABLE VIDEO AND AUDIO

BACKGROUND OF THE INVENTION

The present invention relates to a system for processing packetized audio and video data at a television set-top terminal. More particularly, the system allows a television viewer to select specific camera angles and audio feeds of an event which is broadcast by a programming service provider.

Digital transmission of television signals has become increasingly popular since it can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have replaced analog phonograph records in the audio industry.

However, a substantial amount of digital data must be transmitted in any digital television system. Furthermore, transmission bandwidths and carrier frequencies are often constrained by the need to maintain compatibility with existing equipment. Conventional analog radio-frequency (RF) television programming is transmitted in an assigned 6 MHz bandwidth in the spectrum from 54 to 890 MHz. For example, conventional televisions recognize "channel three" as the designation of the television signal in the spectrum from 60 to 66 MHz, while "channel four" is assigned the spectrum from 66 to 72 MHz. Moreover, in many digital set-top terminals, the received audio/video signal is converted to a predefined spectrum, typically channel three or four, before being provided to the television for display.

While a digital television signal is converted to a television-compatible spectrum at the terminal, the signal may be transmitted to the terminal from the service provider in a variety of ways. For example, the digital transmission may be provided over a cable system, or via satellite at a frequency (e.g., 1.2 GHz) which is well above the terrestrial broadcast band. Transmission within the assigned 6 MHz bandwidth is known as an "in-band" transmission, while transmission outside of this region is known as an "out-of-band" transmission. Moreover, while video and audio data which comprise a television program are transmitted in the 6 MHz band, auxiliary control data for all channels is transmitted out-of-band (e.g., at 75.25 MHz).

Digital transmission techniques are superior to analog techniques since they can use the available spectrum more efficiently. For example, using known digital compression techniques, up to ten conventional television programs may be carried in a 6 MHz bandwidth with standard resolution. Proposed high-definition television (HDTV) systems provide greater resolution but consume additional bandwidth.

One way to transmit compressed digital data to a receiver is in the form of packets contained within a packetized data stream. Typically, the packets carrying the compressed video data will be multiplexed with other packets which, for example, carry corresponding audio data and control information which are necessary to reconstruct a television signal. One standard for transporting digital television signals in this manner is the MPEG-2 standard, details of which can found in document AVC-491, version 1, Apr., 1993 published by the Telecommunications Standardization Sector, Study Group 15, Experts Group 4 ATM-Video Coding of the International Organization for Standardization, ISO-IEC/JTC1/SC29/WG11 entitled "Coded Representation of Picture and Audio Information," incorporated herein by reference. Further details of the video syntax and semantics for MPEG-2 video can be found in International Organization for Standardization document ISO/IEC 11172-6 dated Apr. 2, 1993 and entitled "Revised Syntax and Semantics for MPEG-2 Video," also incorporated herein by reference. Also of interest, and incorporated herein by reference, is document MC68VDP/D, a preliminary data sheet entitled "MPEG-2/DCII Video Decompression Processor," ©Motorola Microprocessor and Memory Technologies Group, 1994 which describes a video decompression processor using the MPEG-2 and DigiCipher® II standards.

In the MPEG-2 system (and the similar DigiCipher® II system proprietary to General Instrument Corporation, the assignee hereof) a transport stream, or transport multiplex is made up of a contiguous set of fixed length packets. Each packet is 188 total bytes in length, with the first four of those bytes being defined as the packet header. The payload portion of each packet, which includes either video, audio or other data, is thus normally 184 bytes. However, a variable length adaptation field may be provided to extend the header, when required. When an adaptation field is present, the payload portion of the packet will be correspondingly shorter.

Furthermore, various timing and identification information is provided in different portions of the transport stream. These include a packet identifier (PID) found in the transport header of each transport packet to provide a reference number for identifying the transport packets carrying a specific service component. This number is included in a service definition (e.g., service map, or channel map) used by the receiver to identify those transport packets required to reconstruct a television program signal. The PID may also be referenced for various grooming and remultiplexing functions. In the case of video, audio or isochronous control data, the stream of packets labeled with a single PID represents a single video, audio or isochronous data service elementary stream, respectively. Each type of packet will have a different PID identifying the packet type.

The packetized data stream of a programming service is received by a subscriber via a receiver/descrambler that is typically embodied in a set-top terminal. The terminal decompresses and decodes the digital data and provides the corresponding video, audio and data to an output device (e.g., a television, video recorder, and/or separate high-fidelity audio system). In particular, the viewer selects a channel designation (e.g., channel 2) that corresponds to a particular programming service provider (e.g., network X). The channel map data of the packetized data stream maps the data from the channel designator to the corresponding programming service provider. For example, when a viewer selects "channel 2" on the set-top terminal, programming from "network X" will be processed at the terminal and provided to the television at a fixed, pre-defined carrier frequency, for example, in the spectrum from 60 to 66 MHz (television channel 3).

Moreover, data carried in the packetized data stream may be used by a graphics processor in the terminal to provide an on-screen display of available programming. For example, the display may provide a program guide which lists the program name, viewing time and channel. Additionally, such data may be addressed to particular terminals to provide individual account and billing information.

When the viewer selects a particular programming service to view, the corresponding data packets are retrieved and decompressed to allow reconstruction of the corresponding video and audio signal. In particular, data packets with the appropriate PID are demultiplexed, unpacked and provided to a video decompression processor. Finally, the video and audio signals are modulated at a specific carrier frequency and provided to the television for display.

As can be seen, the advent of digital television transmission techniques provides high fidelity video and audio to subscriber's homes, and further provides the opportunity for new services and features for both entertainment and educational purposes. Moreover, such programming presents lucrative marketing opportunities for service providers and others who market programming to specific demographic groups, including, for example, those who enjoy sports programs, movies, children's programs and the like.

However, conventional systems are somewhat constrained by existing television signal spectrum requirements and channel mapping formats. Accordingly, it would be advantageous to provide a digital transmission system for re-mapping the channel assignment of one or more selected audio and video signals of a programming service. Furthermore, such re-mapping should occur according to user-provided commands. Additionally, it would be advantageous to provide a graphical user interface to assist the user in selecting the audio and video signals. The user interface should be able to group the alternative audio and video signals which are associated with a primary channel of a programming service. The system should be able to group additional audio and video signals of an additional programming service provider when, for example, two or more service providers are covering the same event. Furthermore, the system should be compatible with existing packetized data transmission protocols and channel assignment data provided by programming service providers and/or cable system headend operators.

Such a system would have numerous advantageous applications. For instance, a viewer could tune in to a primary channel which was associated with a particular programming service. The programming service could provide additional video and audio choices that the viewer could select. For example, a viewer watching a sports event could select different camera angles and different audio feeds that are provided on the different audio and video signals of the service without tuning away from the primary channel. The selection process could be carried out via an on-screen display (OSD) that is intuitively easy for the viewer to operate. For instance, a display of a football stadium with different color-coded or numbered regions can allow the viewer to easily select the desired viewing angle, thereby providing the sensation that the viewer is actually in the stands.

Furthermore, it would be advantageous for such a system to be arranged so that other channel assignments would remain intact, thereby enabling other viewers to view other primary channels at another television in the same home at the usual pre-assigned channel designation. The present invention provides the above and other advantages.

SUMMARY OF THE INVENTION

The present invention provides a method and apparatus for allowing a television viewer to control the re-mapping of channel assignments in a digital video decoding terminal in order to access alternative video and/or audio signals of a programming service provider.

In particular, a terminal is presented for processing a packetized data stream which includes data from primary and alternative signals of a first programming service (e.g., network X). The primary signal is associated with a first channel designator (e.g., channel 10). The channel designator is used to inform the viewer that he can view a particular programming service at a particular channel which is indicated by the terminal.

The terminal also includes means for mapping the alternative signal to the first channel designator. This means that the alternative signal, such as an audio/video signal, can be found by the viewer at the same channel as the primary channel. The viewer, who has come to associate "channel 10" with "network X" therefore knows that he is still viewing a program of network X, even though he has the opportunity to view and listen to a number of alternative video and audio selections.

The mapping means is responsive to a selection command such as that provided via a microprocessor. The selection command may be a default command that occurs when the viewer does not select alternative audio/video, when the alternative service is not available for a given programming service at a given time, or when the viewer has not been authorized to access the alternative audio/video.

The terminal also includes means for providing the data of the alternative signal to a device for reproduction of a video and/or audio program. This may include, for instance, a video decompression processor and a modulator which provides a signal having a carrier frequency which is compatible with the television or display monitor.

The terminal may also process data from a second programming service (e.g., network Y), which has a second channel designator (e.g., channel 11). The user can select the data of the second programming service to be displayed under the first channel designator (channel 10). This may be useful, for instance, when two or more service providers cover the same event, and the viewer wishes to have unified control of all available audio and video options.

The terminal may include a user interface such as a hand-held remote control unit which is responsive to a user-provided command. If the user does not enter a command to access the alternative audio/video, a default setting in the terminal provides the data of the primary audio/video signal to the television.

In a particularly advantageous embodiment, the terminal includes an on-screen display (OSD) graphics processor which allows the viewer to interact with the terminal via a graphical display to allow the user to select among the available audio/video signals. The user may choose to view both the primary and alternative video signals, for example, in a split-screen or picture in picture format, while listening to only one of the audio signals.

In an alternative embodiment, the terminal processes a packetized data stream including data corresponding to a signal of a first programming service which is associated with a first channel designator, and a signal of a second programming service. The terminal includes mapping means responsive to a selection command for mapping the signal of the second programming service to the first channel designator. Additionally, the terminal includes means responsive to the first channel designator for providing the data of the signal of the second programming service to an output device for reproduction. The signal of the second programming service may be associated with a second channel designator which is different than the first channel designator.

Corresponding methods are also presented.

DESCRIPTION OF THE PREFERRED EMBODIMENTS

The present invention allows a television viewer to select among a choice of available camera angles and audio feeds when viewing a program such as a football game. An interactive graphical display informs the user of the available options.

Currently, in many broadcast events such as a football game or other sports event, service providers use several cameras and audio feeds in order to provide viewers with a variety of camera angles and sounds. For instance, over twenty cameras are typically used in a professional football game broadcast. The service provider therefore must decide which camera angle and audio feed are transmitted to the viewer based on its best judgment of what the viewer is interested in.

This inevitably results in many compromises, since a particular viewer may prefer a particular camera angle, such as an overhead view, while another viewer prefers a close-up sideline view. Moreover, one viewer may prefer to hear the game broadcast by a first announcer, while another prefers a second announcer. The announcers may provide alternate language broadcasts, or may slant the coverage toward one of the participating teams. Alternatively, a viewer may not want to hear the announcer at all, but may wish to listen to a field-level audio feed. In accordance with the present invention, the viewer can act as his own programming director and easily switch between available video and audio signals.

Alternatively, the invention may be used with other types of programming to allow the viewer to interact with, and customize the programming to his liking. For instance, in a movie transmitted by a service provider, the viewer may be afforded the opportunity to select different story lines and plot characters. At predefined points in the movie, the program will pause and the viewer can select from a variety of options. In accordance with the viewer selection, the corresponding programming segment is displayed.

As a further example, the invention may be used for educational purposes. For instance, an educational lecture with a multiple choice exam may be broadcast to the viewer. Depending on the viewer's selected answer, a corresponding programming segment will be displayed which informs the viewer if his answer was correct. Then, a programming segment corresponding to either a review lecture or a more advanced lecture can be displayed.

Numerous other applications exist which would benefit from allowing a viewer to customize programming to enhance its entertainment and educational value.

Figure 1:
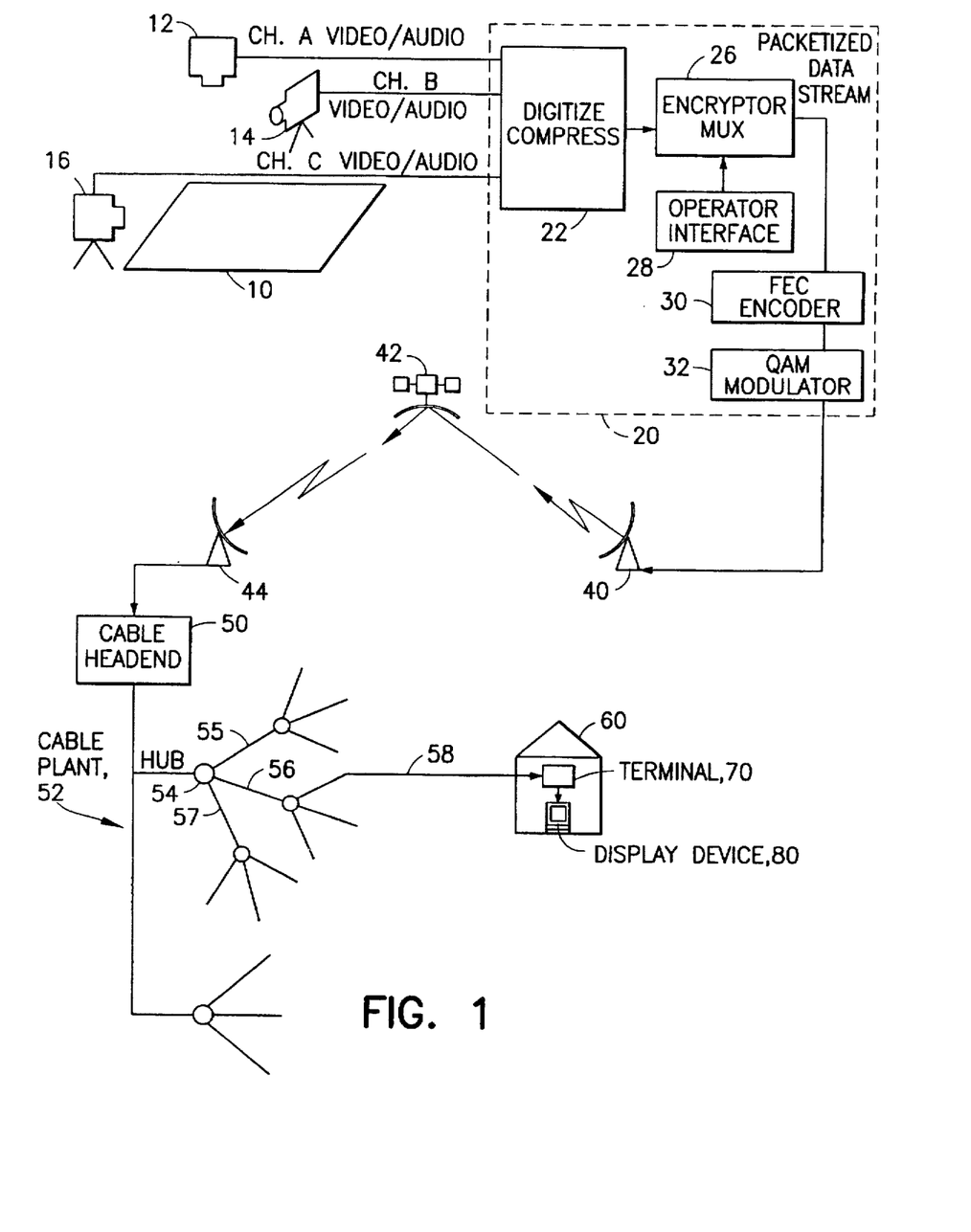
FIG. 1 is a diagrammatic illustration providing an overview of the encoding, transmission, reception, and distribution scheme in accordance with the present invention.

FIG. 1 is a diagrammatic illustration providing an overview of an encoding, transmission, reception, and distribution scheme in accordance with the present invention. In one embodiment of the invention, a sporting event played on a field 10 is monitored by video cameras 12, 14 and 16, which include corresponding audio feeds. Cameras 12, 14 and 16 provide video and audio signals on channel A, channel B and channel C, respectively as shown. While three cameras and audio feeds are shown, it will be understood that additional cameras and audio feeds may be provided on additional channels. Furthermore, the audio feeds need not be associated with particular cameras.

The video and audio signals from channels A, B and C are provided to a processing function 22 of a transmitting apparatus 20. The transmitting apparatus 20 is typically located near the field 10 in an equipment vehicle used by the programming service provider. The processing function 22 digitizes and compresses the video and audio signals of channels A, B and C. Function 22 provides a packetized data stream that includes video, audio and other data in separate packets, each of which is identified by a particular PID. The packetized data stream may conform to the aforementioned MPEG-2 or DigiCipher® II standards.

The packetized data is combined with control messages from an operator interface 28 at multiplexer/encryptor 26. The control messages include information on the locations of the video cameras and audio feeds. For instance, the control messages will specify that video camera 16 is located at the end-zone of the field 10, video camera 14 is located at the sideline, and video camera 12 provides an overhead view of the field 10. The control messages may also specify that a particular audio feed is associated with a particular video camera, and may specify that a particular video and audio signal, e.g., channel A, is a default or primary signal which should initially be displayed on the viewer's television.

The control message may further include graphics data which, for instance, provides a graphical display of the field 10 and the relative locations of the cameras and audio feeds. Additionally, the control messages may include code download packets, channel map information, frequency table information, and virtual channel assignments. A code download packet includes computer software that is to be downloaded to a viewer's set-top terminal. The code controls the operation of the terminal, including the associated user interface and OSD processor. The channel map information assigns a particular transmission spectrum to a particular programming service provider. Information transmitted over a particular spectrum may be re-transmitted over a different spectrum as long as a sufficient channel bandwidth is maintained. The channel map information accesses the frequency table information to accomplish this task. A virtual channel assignment associates a particular channel designator (e.g., channel 10) with a corresponding programming service provider (e.g., network X).

Encryption takes places at function 26 in accordance with one or more specified cryptographic keys to prevent unauthorized viewers from accessing the programming. Such encryption techniques are well known in the art. The packetized data stream exiting from function 26 is then provided to forward error correction (FEC) encoder 30, and then modulated at QAM modulator 32 to provide a packetized data stream that is ready for transmission.

The packetized data stream is transmitted via antenna 40 to a satellite 42 and antenna 44. Although a satellite transmission path is shown, it will be understood that other transmission paths may be employed, such as cable links and so-called wireless cable, which operates at microwave frequencies. The packetized data stream is provided to a cable headend processing function 50, where it may be combined with programming received from other sources, such as local television stations. Additionally, control data is added by the headend system operator to control distribution of the programming.

The packetized data stream is then transmitted via the cable plant, shown generally at 52, to a number of subscribers in their homes or businesses. Conventionally, a hub and spoke distribution system is provided including a representative hub 54, and representative links 55, 56, 57 and 58. Link 58 provides the data stream to the set-top terminal 70 in a subscriber's home 60 for display on a display device 80 such as a television. Alternatively, the data stream can be provided to the subscriber's home directly from satellite 42, via a home satellite receiver.

Figure 2:
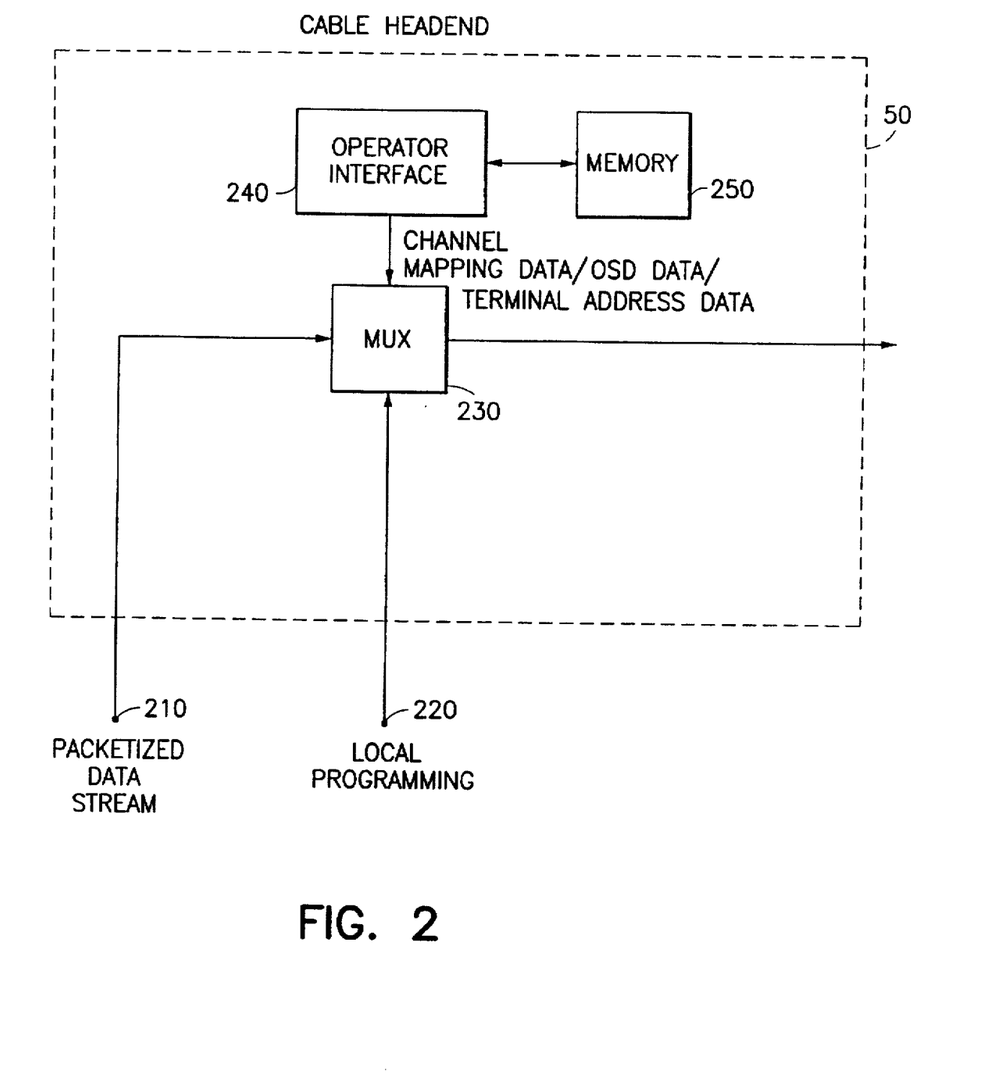
FIG. 2 is a diagrammatic illustration of a cable distribution system headend in accordance with the present invention.

FIG. 2 is a diagrammatic illustration of a cable distribution system headend 50 in accordance with the present invention. The packetized data stream is received at terminal 210 and provided to a multiplexer 230. Local programming is received at terminal 220 and also provided to the multiplexer 230. The multiplexer 230 further receives data from an operator interface 240 which communicates with a memory 250.

The operator interface 240 may provide channel mapping data, on-screen display graphics data, and terminal address data. For instance, the channel mapping data will specify that a particular programming service (e.g., network X) will be provided on a particular channel designator (e.g., channel 10) of a set-top terminal. In some cases, the desired channel mapping data will already be included in the data stream. Generally, the headend operator will have preset channel assignments for the different service providers. Moreover, the number of alternate audio and video signals provided from a particular service provider may vary. Accordingly, the headend operator may map the primary audio and video channel from the service provider to a new channel designator, and may map the alternative audio and video channels to other channel designators that are not currently assigned.

Alternatively, the headend operator may insert control data via the multiplexer 230 that groups the audio and video signals of the packetized data stream and local programming together. For example, the audio of a local announcer provided via terminal 220 may be grouped with the video of the packetized data stream provided via terminal 210. In this manner, local viewers may listen to a local announcer's coverage of a nationwide network broadcast event. Furthermore, the headend operator may provide control data that groups audio and video from different service providers, such as when two or more service providers cover the same event. The viewer may then access all available programming via a single graphical interface, to be discussed in greater detail below.

Additionally, the headend operator has the opportunity to group particular audio and video signals from the packetized data stream according to a tiered marketing scheme. For instance, viewers who pay for a basic level of service may be authorized to access only a primary audio/video signal broadcast of an event. Other viewers who pay an additional fee can be authorized to access some or all of the other available audio and video feeds. The audio/video may also be grouped according to a rating scheme based on, e.g., adult content, violence or the like.

Channel mapping data, OSD data, and terminal address data may be stored in memory 250 for use by the operator interface 240. While some graphics data may be provided in the packetized data stream received via 210, the headend operator may provide additional graphics data for use in an OSD at the viewer's television. For example, the display may provide a program guide which lists the program name, viewing time and particular channel mapping scheme. Other marketing information may be provided to allow the viewer to order additional services from the cable operator.

As noted above, however, the packetized data stream may alternatively be transmitted directly to an antenna at the viewer's home. Such transmissions, known as Direct Broadcast Satellite (DBS) transmissions, do not require intervention by a cable system headend such as the headend 50 of FIG. 2. However, in such an embodiment, various control data and the like can be inserted at the satellite uplink in much the same way that it can be added at a cable system headend.

Figure 3:
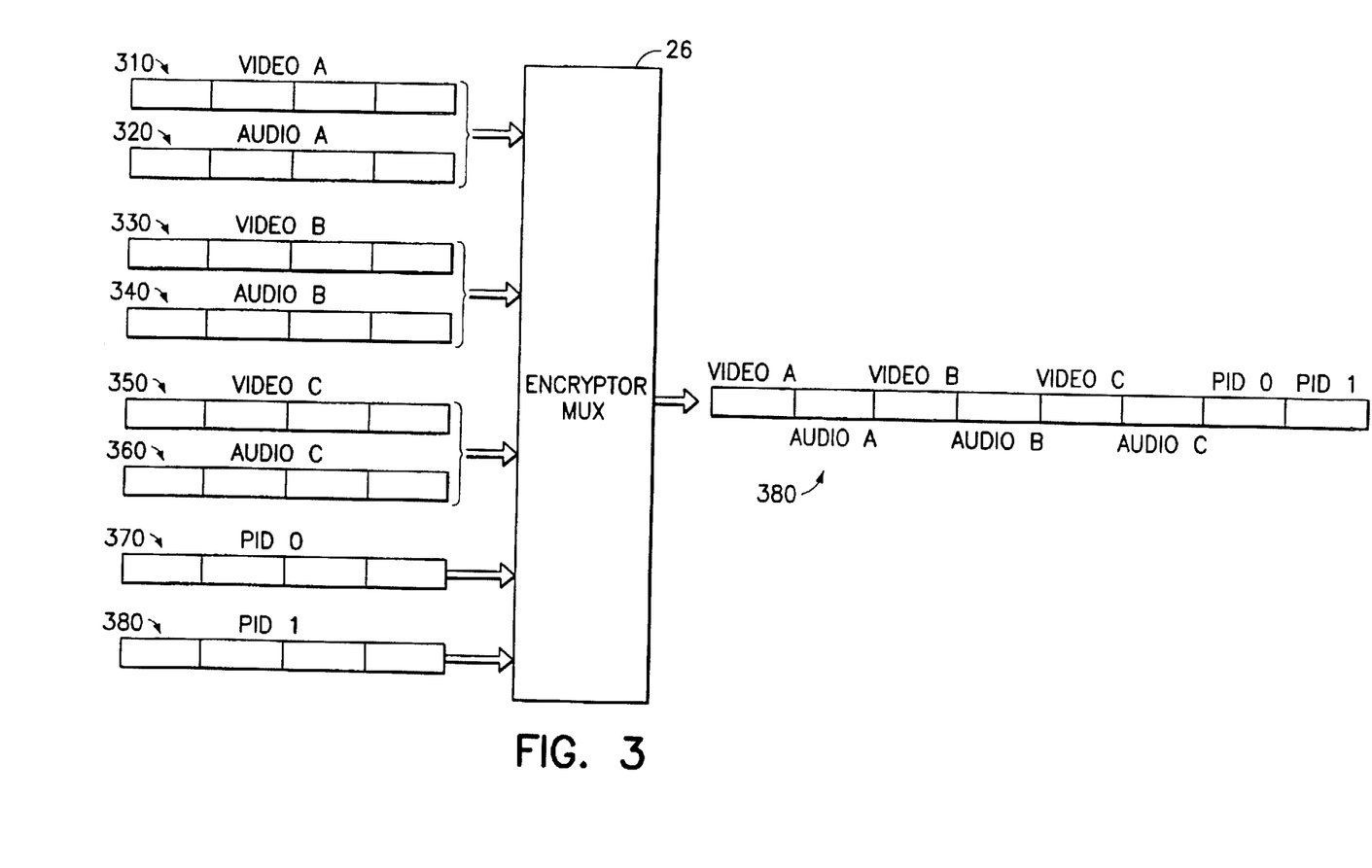
FIG. 3 is a diagrammatic illustration of an in-band packetized data stream in accordance with the present invention.

FIG. 3 is a diagrammatic illustration of an in-band packetized data stream in accordance with the present invention. The packetized data stream from function 22 in FIG. 1 is provided to encryptor/multiplexer 26. The data stream includes channel A video packets 310, channel A audio packets 320, channel B video packets 330, channel B audio packets 340, channel C video packets 350, and channel C audio packets 360. Also included are in-band control data packet PID 0, shown at 370, and in-band control data packet PID 1, shown at 380. The audio and video packets of a particular channel are shown grouped in a video/audio pair, but this is not required. For instance, an audio feed can be provided without an accompanying video feed.

The audio and video data packets are time-multiplexed by multiplexer 26 to provide the packetized data stream 380. The data stream 380 is modulated at a specific carrier frequency according to the transmission scheme (e.g., via cable or satellite) and the programming service provider. For example, network X may use a 6 MHz bandwidth at a carrier frequency of 1.2 GHz to broadcast its signal over the satellite link (40, 42, 44) of FIG. 1. Moreover, the ten channels carried in a 6 MHz bandwidth may correspond to one or more programming service providers. Similarly, a single service provider may consume a spectrum of more than 6 MHz.

Figure 4:
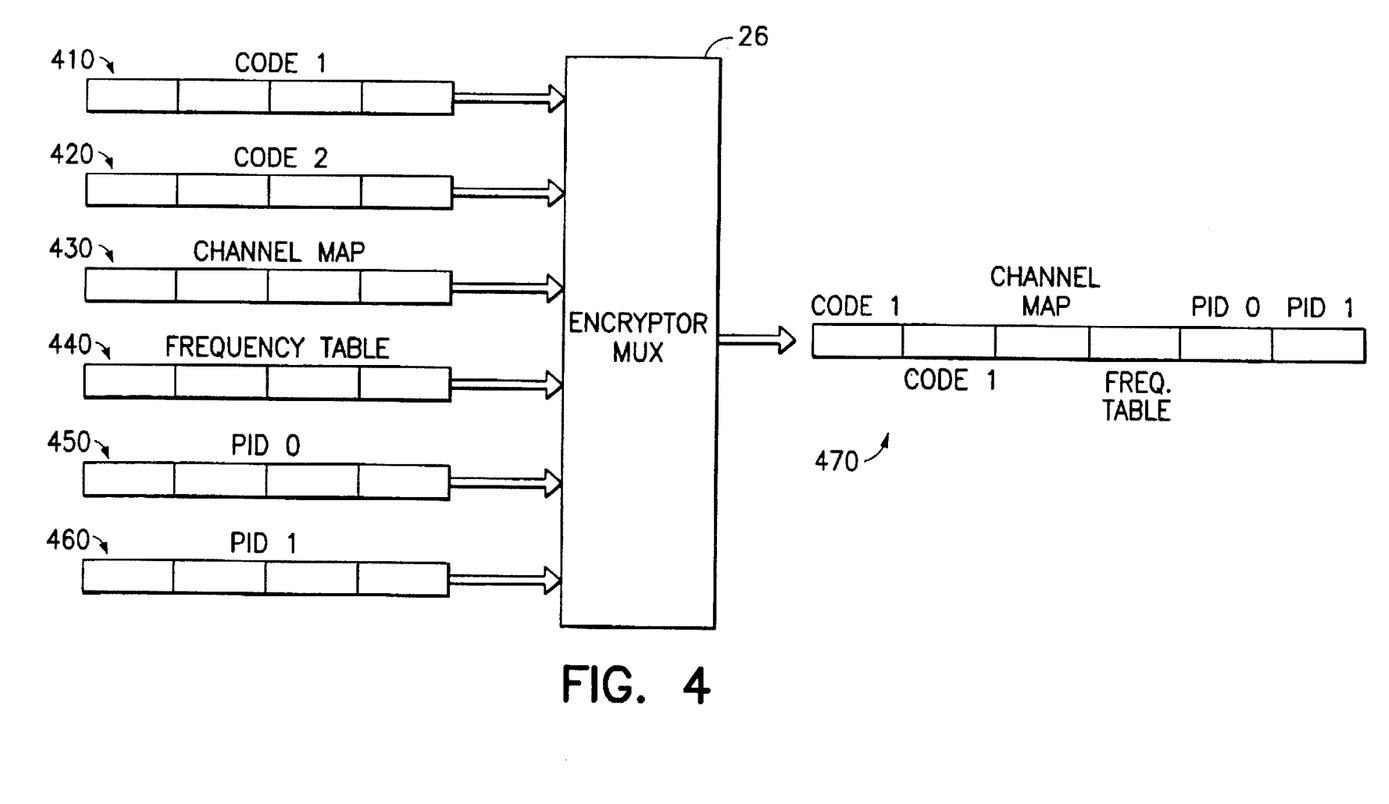
FIG. 4 is a diagrammatic illustration of an out-of-band packetized data stream in accordance with the present invention.

FIG. 4 is a diagrammatic illustration of an out-of-band packetized data stream in accordance with the present invention. The packetized data stream from operator interface 28 in FIG. 1 is provided to encryptor/multiplexer 26. The data stream includes "code 1" download packet 410, "code 2" download packet 420, channel map packets 430, frequency table packets 440, and out-of-band control data packets PID "0" 450 and PID "1" 460.

The control message data packets are time-multiplexed by multiplexer 26 to provide the packetized data stream 470. The data stream 470 is modulated to a specific carrier frequency (e.g., 75.25 MHz) that is out of the band used for transmission of the data packets 380 of FIG. 3.

Figure 5:
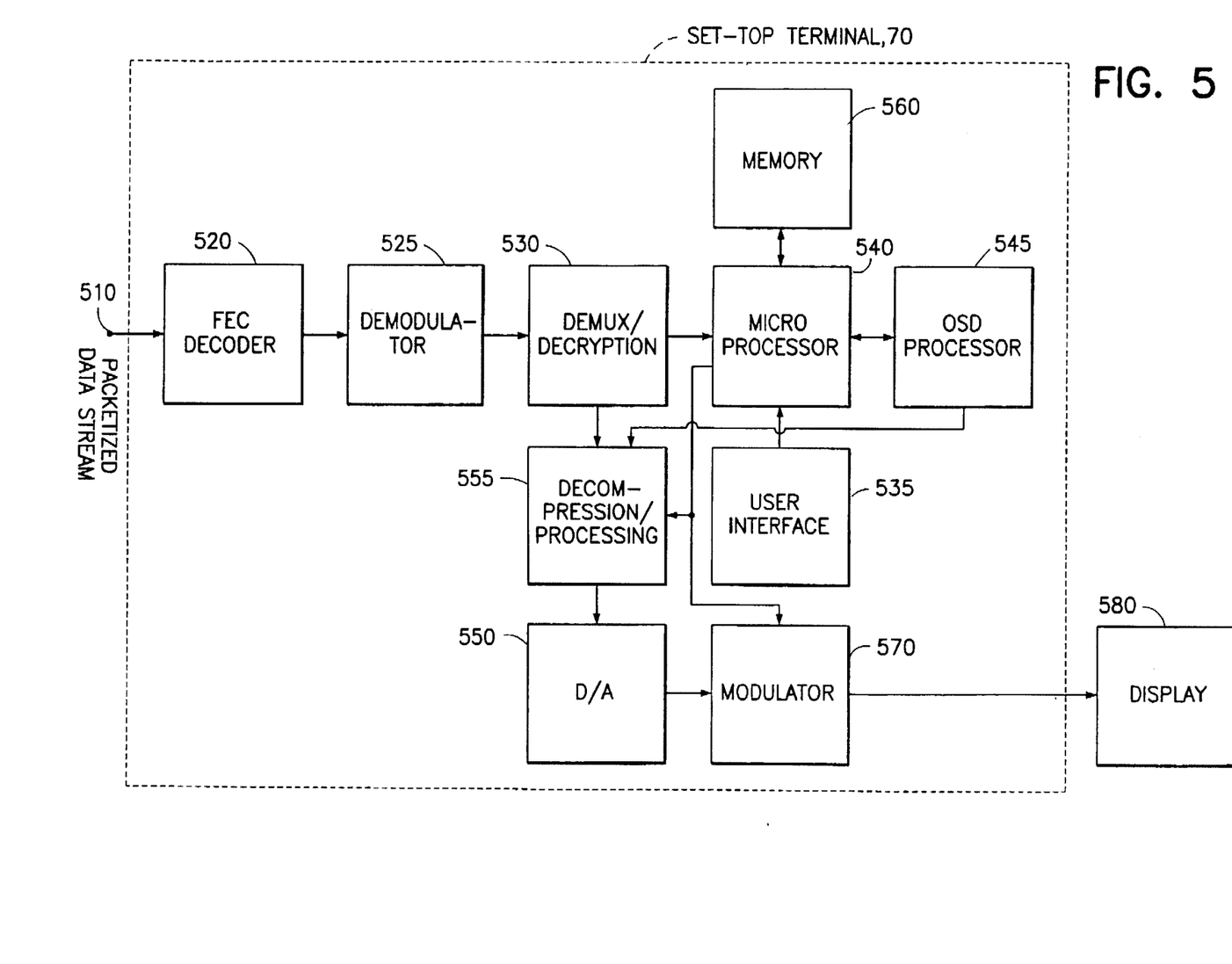
FIG. 5 is a block diagram of a set-top terminal in accordance with the present invention.

FIG. 5 is a diagrammatic illustration of a set-top terminal in accordance with the present invention. The set-top terminal 70 shown is used in conjunction with a cable distribution system. Alternatively, in a DBS system, the terminal 70 may receive transmissions directly from a satellite. In either case, one or more packetized data streams are received at input 510, then provided to an FEC decoder 520 and a demodulator 525. The demodulator 525 has the capability to demodulate both in-band and out-of-band data streams. In the demodulation process, the modulated signal is mixed with a signal having the same carrier frequency, thereby providing the packetized data stream in a baseband signal.

The demodulated packetized data stream is then provided to demultiplexer/decryptor 530, where the encrypted data packets are decrypted and separated into two data paths. In a first path, control data packets such as packets 470 from FIG. 4 are provided to a microprocessor controller 540, such as the Model 68331 processor manufactured by Motorola Corporation. In the other path, video and audio packets are provided to a processing and decompression function 555.

The control data packets, which include code download packets, channel map packet data, frequency table packet data, and other miscellaneous control data are received and stored in memory 560, which may comprise a random access memory (RAM). The object code from the code download packets is executed by the microprocessor 540 and OSD graphics processor 545 to provide the alternative audio and video capabilities of the present invention. For instance, the "code 1" packets 410 may include code related to on-screen graphics, while the "code 2" packets 420 relate to channel mapping and grouping. Additional or fewer code packets may be provided as required. Alternatively, the code need not be downloaded from the packetized data stream, but may be installed at the terminal 70 locally, either at the time of manufacture, or by the viewer via an access port and a so-called "smart card." A smart card is a credit-card shaped object that includes a memory for storing code. When inserted into an access port of a terminal, the code is downloaded to the terminal's memory. Channel map packet data, frequency table packet data, and other miscellaneous control data is also received by the microprocessor 50 and stored in memory 560 as required. As mentioned, the channel map data and frequency table data assign the data packets of the various programming services to channel designators according to a PID in each incoming data packet.

The microprocessor 540 also receives a signal from a user interface 535, which is responsive to viewer commands. Such commands may be issued via an infra-red light emitting remote control, a touch-sensitive screen, voice recognition, or other convenient mechanism. In accordance with the present invention, the OSD graphic processor 545 and display device 580 provide a particularly advantageous arrangement. The OSD processor 545 receives OSD data provided by either the programming service provider and/or by a cable headend. The OSD data allows the processor 545 to provide a variety of graphical displays on the display device 580, which may be a standard television, or alternatively, the graphics display may be provided on a separate display device such as a video monitor (not shown). The display device 580 reproduces the data of the audio and video signals.

In response to OSD data received via the packetized data stream and the code download packets, the OSD processor 545 can create a graphical display that informs the viewer of the various audio and video options available. For instance, a graphical display of a football stadium may show various segments of the stadium as color-coded or numbered regions. Icons which represent available viewing angles and audio feeds may also be used. The graphical display may allow the viewer to choose team-specific video and audio configurations that will provide coverage that is slanted toward the home team, for instance (e.g., press "1" for home team coverage). In this case, the audio would include announcers which are partial to the home team, while the video includes additional coverage of the home team.

Similarly, the graphical display provided by the OSD processor 545 can allow the viewer to select audio and video which provide post-game interviews of the home team or the visiting team. Other display options will be more suitable for other applications. For instance, a display associated with an educational program may include a multiple-choice quiz format which instructs the viewer to provide an answer by pressing a corresponding button on a hand-held remote control.

Thus, the display will instruct the viewer to press a particular key on a hand-held remote control infra-red transmitter, for instance, to receive particular audio and video signals on the display device 580. The display can inform the viewer of the default audio and video settings, or provide the viewer with instructions as to changing the default settings. The user interface 535 will receive the viewer's commands and provide them to the microprocessor 540 and memory 560. The memory may store information that identifies the particular viewer so that subsequent displays may be automatically customized.

The microprocessor 540 will issue selection commands to the processing and decompression function 555 according to the code, signals from the user interface 535, and channel mapping and control data stored in memory 560. For instance, assume the viewer has not yet entered any commands to the user interface 535 other than selecting a primary channel to view. The microprocessor will then determine which audio and video packets in the received data stream correspond to the primary signals of the particular programming service provider (e.g., network X). Using the packet PIDs, the appropriate video and audio packets will be processed at function 555. Additionally, OSD data from the OSD processor 545 will be combined with the video signal at function 555 to form a composite video signal, which can allow, for instance, a split screen or overlay format with part of the screen of the device 580 displaying the OSD graphics, and part of the screen displaying the video data.

The output from function 555 will be a baseband signal carrying digital audio, video and graphics data. The baseband signal will be converted to an analog signal at digital-to-analog (D/A) converter 550, then provided to a modulator 570. At the modulator 570, the analog signal is modulated at an RF carrier frequency which is set by the microprocessor 540, or at a default frequency (e.g., 60–66 MHz) which is compatible with the display device 580. In accordance with the present invention, the microprocessor 540 can change the pre-assigned channel mapping data of the audio and video packets corresponding to a particular programming service provider and channel designation. This allows the alternate audio and video signals which are associated with the same program to be selected by the viewer and displayed on the device 580. For instance, the primary audio and video signals of the service provider network X may be associated with the designator "channel 10". The present invention can modify the channel mapping such that alternate video and audio signals of "network X" are displayed on "channel 10."

In particular, consider the case where the viewer has commanded the user interface 535 to select an audio or video channel other than the primary channel. Upon receiving the user's command, the microprocessor will read the channel mapping and associated data stored in the memory 560 to determine which data packets correspond to the user's selection. Upon determining the appropriate PIDs, the microprocessor 540 will provide a selection command to the decompression and processing function 555 to instruct it to process the corresponding data packets. The new audio and video signal will then be provided to the D/A converter 550, and then to the modulator 570. The new baseband analog signal provides alternative audio and video signals of a service provider which are modulated at the same RF carrier signal as the primary audio/video signals. The viewer thus has the ability to customize the programming service, thereby optimizing its entertainment and educational value.

Figure 6:
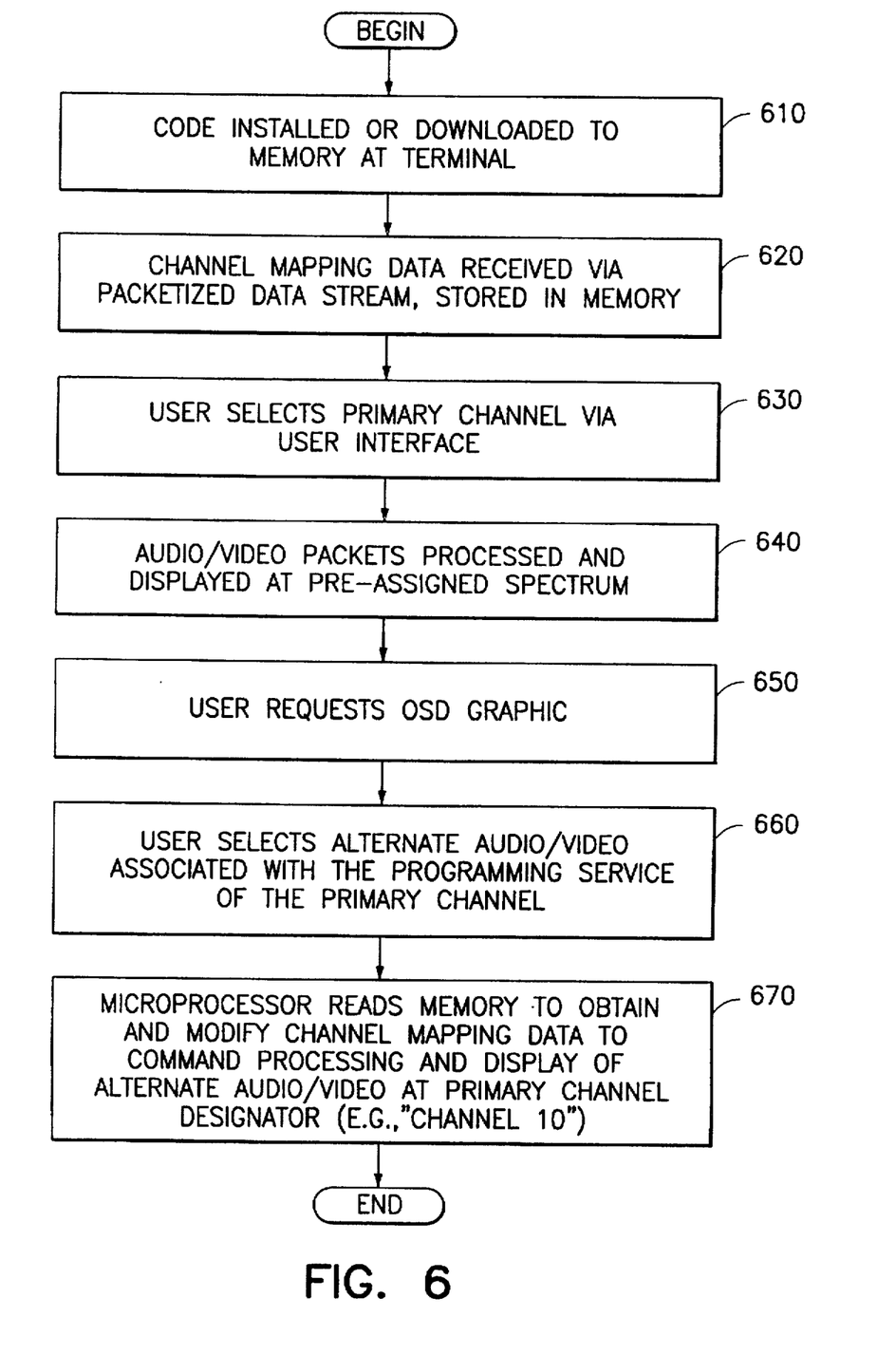
FIG. 6 is a flow chart illustrating a user selection process in accordance with the present invention.

FIG. 6 is a flow chart of the user selection process in accordance with the present invention. At block 610, software (e.g., object code) is downloaded or installed to the terminal and stored in memory. The object code, which is compiled source code that is written in a language which may vary according to the specific terminal platform, comprises a set of instructions for the microprocessor 540 and OSD processor 545 of the terminal 70 of FIG. 5. At block 620, channel mapping and other control data, such as the frequency table data, is received via the packetized data stream and stored in memory. The channel mapping data includes pre-assigned channel designations on which the various programming service's audio/video signals are displayed. At block 630, the user selects the primary channel of a programming service provider via the user interface. At block 640, the audio and video packets of the selected primary channel are processed and displayed with the pre-assigned channel designation. At block 650, the user invokes the OSD graphic display to determine the availability of alternative audio and video signals which are associated with the selected programming service provider.

In some cases, such as when different programming service providers (e.g., network X and network Y) are covering the same or related events, it may be appropriate for the OSD graphics display to group the primary and/or alternative audio and video signals of the different programming services. In order to know that two or more service providers are covering the same event, corresponding data must be provided to the terminal via the downloaded code, channel mapping data, or other control data. The data may correlate audio/video data of an event from a single service provider which are provided in adjacent or non-adjacent locations in the spectrum of the received packetized data stream. Furthermore, the interface may allow the viewer to group selected signals.

At block 660, the user selects the desired alternative audio/video signals (e.g., sideline camera angle and audio feed of a sporting event). At block 670, the microprocessor of the terminal reads the memory to obtain and modify the channel mapping and other control data corresponding to the selected audio and video signals. The microprocessor then issues a selection command to the decompression and processing function so that the corresponding audio and video packets are processed and displayed along with the OSD graphics. Furthermore, the selection command is optionally provided to a modulator so the composite audio, video and graphics signal will be displayed on a pre-defined spectrum corresponding to the primary channel.

Figure 7:
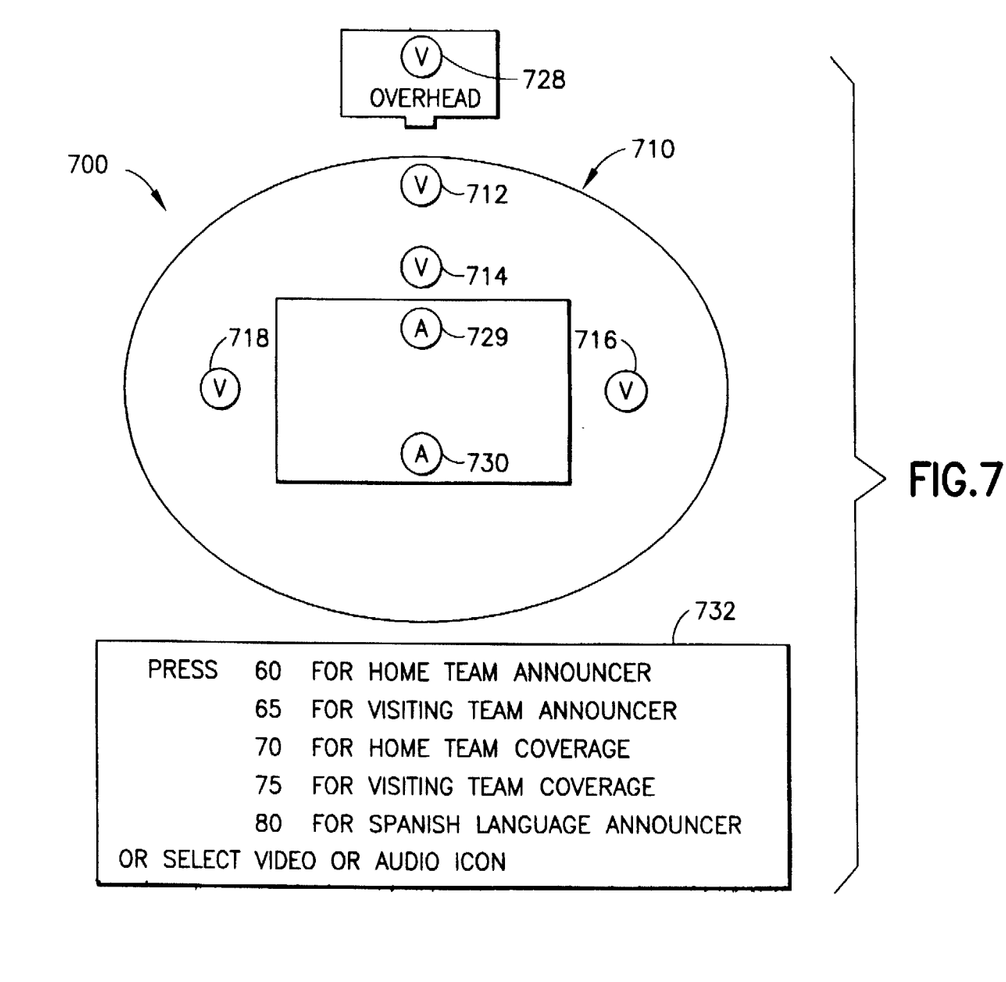
FIG. 7 is an on-screen display in accordance with one embodiment of the present invention.

FIG. 7 is an on-screen display in accordance with one embodiment of the present invention. Control messages in the packetized data received by a set-top terminal are used to provide a display 700, e.g., of a football stadium 710, and the relative locations of the cameras and audio feeds. Icons which represent the available viewing angles and audio feeds may be used. For example, icons 712, 714, 716 and 718 and 728 represent the available viewing angles, and icons 729 and 730 represent the available audio feeds. A text region 732 informs the viewer of other available video and audio options.

Figure 8:
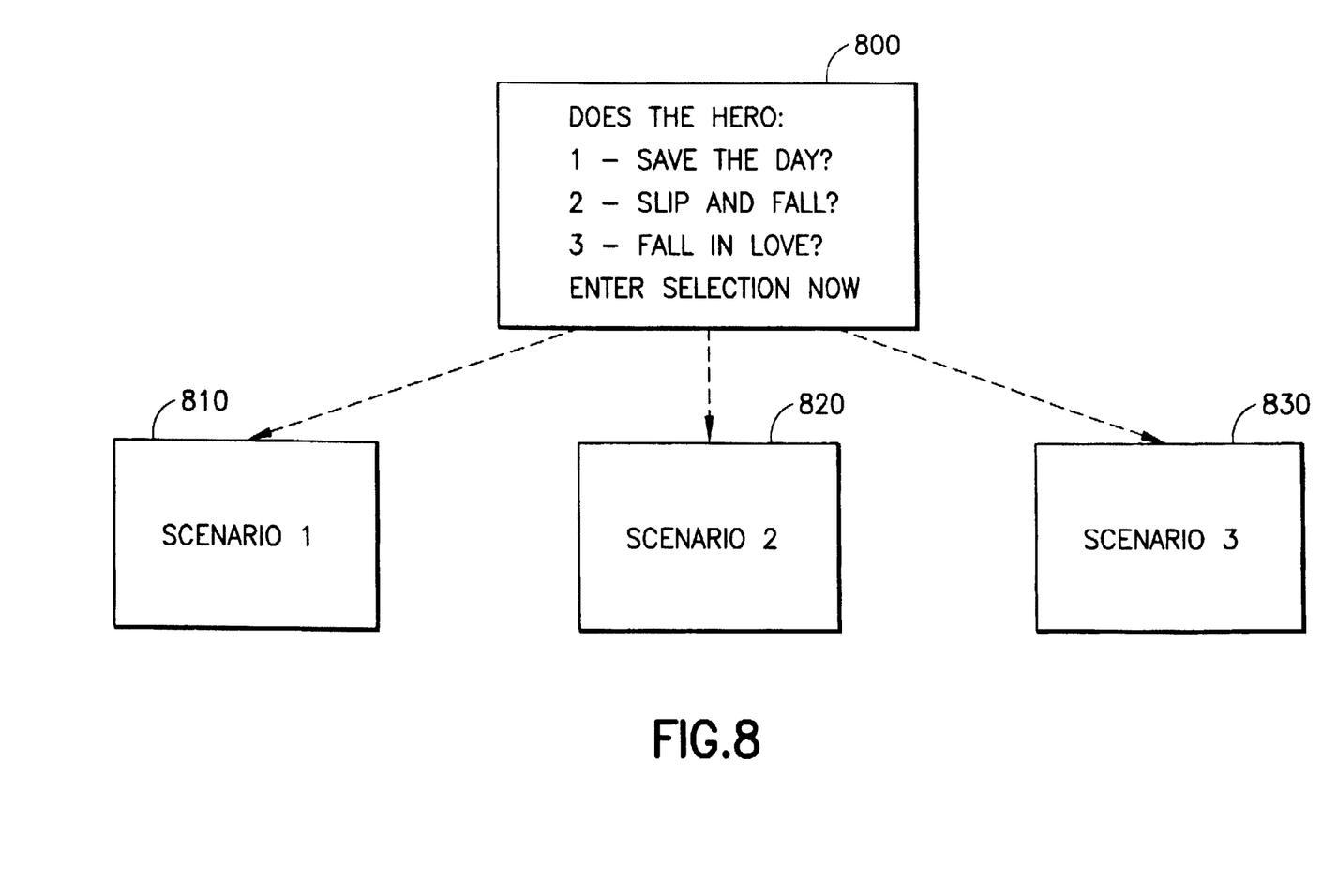
FIG. 8 is an on-screen display in accordance with another embodiment of the present invention.

FIG. 8 is an on-screen display in accordance with another embodiment of the present invention. An on-screen display 800 allows a viewer to select different story lines, e.g., in a movie, at predefined points in the movie. For illustration, three optional scenarios are presented. The selected scenario is then displayed, e.g., scenario 1 (810), scenario 2 (820), or scenario 3 (830).

Accordingly, it can be seen that the present invention allows a television viewer to select among available audio and video programming alternatives to customize a programming service according to his or her particular interests. The service provider transmits different audio and video signals, e.g., of a sporting event, along with corresponding OSD graphics data, channel mapping and other control data in a packetized data stream to a cable system headend, or directly to a terminal at the viewer's home. At the terminal, the data is processed according to object code stored therein to provide the viewer with a display that presents the available audio and video options. Based on the viewer's selections, the corresponding audio and video data packets are retrieved, processed and displayed on a primary channel designator of the programming service provider. Alternatively, the programming service provider, cable system headend, or locally installed object code, may provide control data that allows the programming of two or more service providers to be grouped, such as when the same service providers are covering the same event. Or, the code which is downloaded to the terminal may provide such grouping information. This can provide the viewer with an OSD display of the alternative audio and video signals of the two or more programming services, thereby optimizing the viewer's control and ability to customize the programming. Moreover, in addition to audio and video signals, data such as statistics on a sports team or individual player, team schedule, or the like, may be provided via the data stream or code. Furthermore, the viewer may be provided with the capability to review a program segment via a re-run feature when appropriate memory and control means are provided.

Although the invention has been described in connection with various specific embodiments, those skilled in the art will appreciate that numerous adaptations and modifications may be made thereto without departing from the spirit and scope of the invention as set forth in the claims.

I claim:

1. A method for communicating a packetized data stream including video data corresponding to a primary signal and at least first and second alternative video signals which are associated with said primary signal, said primary signal being associated with a first channel designator, comprising the steps of:

providing control data in said packetized data stream which associates said primary signal and said first and second alternative video signals;

transmitting said packetized data stream to a terminal;

reproducing said primary signal on an output device which is associated with said terminal during a first time period under said first channel designator;

at an end of said first time period, using said control data to provide an on-screen display on said output device to assist a user in selecting one of said first and second alternative video signals for reproduction on said output device during a second time period which follows said first time period; and mapping the selected alternative video signal to said first channel designator to allow the selected alternative video signal to be displayed on said output device under said first channel designator.

2. The method of claim 1, wherein said selected alternative video signal is said first alternative video signal, at least third and fourth alternative video signals are associated with said first alternative video signal, and said control data associates said first alternative video signal with said third and fourth alternative video signals, comprising the further steps of:

reproducing said first alternative video signal on said output device during said second time period in response to said user command;

at an end of said second time period, using said control data to provide an on-screen display on said output device to assist the user in selecting one of said third and fourth alternative video signals for display on said output device during a third time period which follows said second time period; and mapping the selected third or fourth alternative video signal to said first channel designator to allow the selected third or fourth alternative video signal to be reproduced on said output device under said first channel designator.

3. The method of claim 1, wherein:

said primary signal comprises a first part of a story line, and said first and second alternative video signals comprise alternative second parts of said story line.

4. A method for processing a packetized data stream which is transmitted to a terminal, said packetized data stream including video data corresponding to a primary signal and at least first and second alternative video signals which are associated with said primary signal, said primary signal being associated with a first channel designator, comprising the steps of:

recovering control data at said terminal from said packetized data stream, said control data associating said primary signal and said first and second alternative video signals;

reproducing said primary signal on an output device which is associated with said terminal during a first time period under said first channel designator;

at an end of said first time period, using said control data to provide an on-screen display on said output device to assist a user in selecting one of said first and second alternative video signals for reproduction on said output device during a second time period which follows said first time period; and mapping the selected alternative video signal to said first channel designator to allow the selected alternative video signal to be reproduced on said output device under said first channel designator.

5. The method of claim 4, wherein said selected alternative video signal is said first alternative video signal, and at least third and fourth alternative video signals are associated with said first alternative video signal, and said control data associates said first alternative video signal with said third and fourth alternative video signals, comprising the further steps of:

reproducing said first alternative video signal on said output device during said second time period in response to said user command;

at an end of said second time period, using said control data to provide an on-screen display on said output device to assist the user in selecting one of said third and fourth alternative video signals for reproduction on said output device during a third time period which follows said second time period; and mapping the selected third or fourth alternative video signal to said first channel designator to allow the selected third or fourth alternative video signal to be reproduced on said output device under said first channel designator.

6. The method of claim 4, wherein:

said primary signal comprises a first part of a story line, and said first and second alternative video signals comprise alternative second parts of said story line.

7. A terminal for processing a packetized data stream which is transmitted thereto, said packetized data stream including video data corresponding to a primary signal and at least first and second alternative video signals which are associated with said primary signal, said primary signal being associated with a first channel designator, comprising:

means for recovering control data at said terminal from said packetized data stream, said control data associating said primary signal and said first and second alternative video signals;

means for reproducing said primary signal on an output device which is associated with said terminal during a first time period under said first channel designator;

means for using said control data to provide an on-screen display on said output device at an end of said first time period to assist a user in selecting one of said first and second alternative video signals for reproduction on said output device during a second time period which follows said first time period; and means for mapping the selected alternative video signal to said first channel designator to allow the selected alternative video signal to be reproduced on said output device under said first channel designator.

8. The terminal of claim 7, wherein said selected alternative video signal is said first alternative video signal, and at least third and fourth alternative video signals are associated with said first alternative video signal, and said control data associates said first alternative video signal with said third and fourth alternative video signals, further comprising:

means for reproducing said first alternative video signal on said output device during said second time period in response to said user command;

means for using said control data to provide an on-screen display on said output device at an end of said second time period to assist the user in selecting one of said third and fourth alternative video signals for reproduction on said output device during a third time period which follows said second time period; and means for mapping the selected third or fourth alternative video signal to said first channel designator to allow the selected third or fourth alternative video signal to be reproduced on said output device under said first channel designator.

9. The terminal of claim 7, wherein:

said primary signal comprises a first part of a story line, and said first and second alternative video signals comprise alternative second parts of said story line.

10. A method for transmitting a primary signal and at least one associated local program signal to a terminal, wherein said primary signal provides a video and audio account relating to an event at a remote location, and said at least one local program signal provides at least one of a video and an audio account relating to said event, comprising the steps of:

transmitting said primary signal from said remote location to a headend of a local television network in a digital packetized data stream;

providing said local program signal at said headend;

providing control data at said headend for associating said primary signal with said local program signal; and transmitting said control data and said primary and local program signals in said packetized data stream via said local television network to said terminal;

wherein said control data is adapted to be used by said terminal to provide an on-screen display to allow a user to select a video and audio account relating to said event from at least one of said primary signal and said local programming signal for reproduction on an output device associated with said terminal.

11. The method of claim 10, wherein:

said control data is adapted to be used by said terminal to provide an on-screen display to allow a user to select said video account of said primary signal and said audio account of said local program signal for reproduction on said output device.

12. The method of claim 10, wherein:

said control data is adapted to be used by said terminal to provide an on-screen display to allow a user to select said audio account of said primary signal and said video account of said local program signal for reproduction on said output device.

13. The method of claim 10, wherein:

said control data is adapted to be used by said terminal to provide an on-screen display to allow a user to select said video and audio accounts of said primary signal for reproduction on said output device.

14. The method of claim 10, wherein:

said control data is adapted to be used by said terminal to provide an on-screen display to allow a user to select said video and audio accounts of said local program signal for reproduction on said output device.

15. The method of claim 10, wherein:

said primary signal has an associated channel designator; and said control data is used by said terminal in mapping said local program signal to said channel designator to allow said terminal to recover either of said primary signal and said local program signal for reproduction on said output device under said channel designator.

16. The method of claim 10, comprising the further steps of:

providing an alternative signal which provides an alternative video and/or audio account relating to said event; and transmitting said alternative signal from said remote location to said headend in said digital packetized data stream;

wherein said control data provided at said headend associates said alternative signal with said primary signal; and said control data is adapted to be used by said terminal to provide an on-screen display to allow a user to select a video and/or audio account relating to said event from said alternative signal for reproduction on said output device.

17. The method of claim 16, wherein:

said primary signal has an associated channel designator; and said control data is used by said terminal in mapping said local program signal and said alternative signal to said channel designator to allow said terminal to recover either of said alternative signal and said local program signal for reproduction on said output device under said channel designator.

18. A method for communicating a packetized data stream including data corresponding to a primary signal which provides a first video viewpoint of an event, and at least a first alternative signal which provides an alternative video viewpoint of said event, said primary signal being associated with a particular channel designator, comprising the steps of:

providing a control message in said packetized data stream which designates locations of said first and alternative video viewpoints;

transmitting said packetized data stream to a terminal;

using said control message to provide an on-screen display on an output device associated with said terminal to inform a viewer of said locations to allow the viewer to select a particular one of said first and alternative video viewpoints; and mapping the selected video viewpoint to said particular channel designator to allow the selected video viewpoint to be reproduced on said output device under said particular channel designator.

19. The method of claim 18, wherein:

said primary data signal comprises first audio data relating to said event, and said alternative signal comprises alternative audio data relating to said event;

said control message provides descriptive information regarding said first and alternative audio data;

said on-screen display informs the viewer of said descriptive information to allow the viewer to select one of said first and alternative audio data; and the selected audio data is mapped to said particular channel designator to allow the selected audio data to be reproduced on said output device under said particular channel designator.

20. An apparatus for communicating a packetized data stream including data corresponding to a primary signal which provides a first video viewpoint of an event, and at least a first alternative signal which provides an alternative video viewpoint of said event, said primary signal being associated with a particular channel designator, comprising:

means for providing a control message in said packetized data stream which designates locations of said first and alternative video viewpoints;

means for transmitting said packetized data stream to a terminal;

means for using said control message to provide an on-screen display on an output device associated with said terminal to inform a viewer of said locations to allow the viewer to select a particular one of said first and alternative video viewpoints; and means for mapping the selected video viewpoint to said particular channel designator to allow the selected video viewpoint to be reproduced on said output device under said particular channel designator.

21. The apparatus of claim 20, wherein:

said primary data signal comprises first audio data relating to said event, and said alternative signal comprises alternative audio data relating to said event;

said control message provides descriptive information regarding said first and alternative audio data;

said on-screen display informs the viewer of said descriptive information to allow the viewer to select one of said first and alternative audio data; and the selected audio data is mapped to said particular channel designator to allow the selected audio data to be reproduced on said output device under said particular channel designator.

22. A method for processing a packetized data stream at a terminal, said packetized data stream including data corresponding to a primary signal which provides a first video viewpoint of an event, and at least a first alternative signal which provides an alternative video viewpoint of said event, said primary signal being associated with a particular channel designator, comprising the steps of:

recovering a control message from said packetized data stream which designates locations of said first and alternative video viewpoints;

using said control message to provide an on-screen display on an output device associated with said terminal to inform a viewer of said locations to allow the viewer to select a particular one of said first and alternative video viewpoints; and mapping the selected video viewpoint to said particular channel designator to allow the selected video viewpoint to be reproduced on said output device under said particular channel designator.

23. The method of claim 22, wherein:

said primary data signal comprises first audio data relating to said event, and said alternative signal comprises alternative audio data relating to said event;

said control message provides descriptive information regarding said first and alternative audio data;

said on-screen display informs the viewer of said descriptive information to allow the viewer to select one of said first and alternative audio data; and the selected audio data is mapped to said particular channel designator to allow the selected audio data to be reproduced on said output device under said particular channel designator.

24. A terminal for processing a packetized data stream which is transmitted thereto, said packetized data stream including data corresponding to a primary signal which provides a first video viewpoint of an event, and at least a first alternative signal which provides an alternative video viewpoint of said event, said primary signal being associated with a particular channel designator, comprising:

means for recovering a control message from said packetized data stream which designates locations of said first and alternative video viewpoints;

means for using said control message to provide an on-screen display on an output device associated with said terminal to inform a viewer of said locations to allow the viewer to select a particular one of said first and alternative video viewpoints; and means for mapping the selected video viewpoint to said particular channel designator to allow the selected video viewpoint to be reproduced on said output device under said particular channel designator.

25. The terminal of claim 24, wherein:

said primary data signal comprises first audio data relating to said event, and said alternative signal comprises alternative audio data relating to said event;

said control message provides descriptive information regarding said first and alternative audio data;

said on-screen display informs the viewer of said descriptive information to allow the viewer to select one of said first and alternative audio data; and the selected audio data is mapped to said particular channel designator to allow the selected audio data to be reproduced on said output device under said particular channel designator.

\* \* \* \* \*